United States Patent
Wu

(10) Patent No.: US 9,673,439 B2
(45) Date of Patent: Jun. 6, 2017

(54) CONNECTING STRUCTURE FOR EXTERIORLY CONNECTING A BATTERY CELL AND A LOAD CIRCUIT BY USING TWO CONNECTING GRAPHITE BLOCKS

(71) Applicant: ENERGY CONTROL LIMITED, Tortola (VG)

(72) Inventor: Donald P. H. Wu, Hsinchu County (TW)

(73) Assignee: ENERGY CONTROL LIMITED, Tortola (VG)

( * ) Notice: Subject to any disclaimer, the term of this patent is extended or adjusted under 35 U.S.C. 154(b) by 753 days.

(21) Appl. No.: 13/849,511

(22) Filed: Mar. 24, 2013

(65) Prior Publication Data

US 2013/0216890 A1 Aug. 22, 2013

Related U.S. Application Data

(63) Continuation-in-part of application No. 12/834,834, filed on Jul. 12, 2010, now abandoned.

(51) Int. Cl.

| H01M 2/26 | (2006.01) |
| H01M 2/28 | (2006.01) |
| H01R 13/03 | (2006.01) |
| H01R 13/02 | (2006.01) |
| H01M 2/30 | (2006.01) |

(52) U.S. Cl.
CPC .............. *H01M 2/26* (2013.01); *H01R 13/03* (2013.01); *H01M 2/30* (2013.01); *H01R 13/025* (2013.01)

(58) Field of Classification Search
CPC ....................................................... H01M 2/30
See application file for complete search history.

(56) References Cited

U.S. PATENT DOCUMENTS

| 4,382,116 A | * | 5/1983 | Gahn et al. | 429/107 |
| 4,442,187 A | * | 4/1984 | MacDiarmid et al. | 429/213 |
| 5,714,053 A | * | 2/1998 | Howard | 205/220 |
| 2004/0265683 A1 | * | 12/2004 | Merrill et al. | 429/56 |
| 2007/0092792 A1 | * | 4/2007 | Kasahara et al. | 429/161 |

\* cited by examiner

*Primary Examiner* — Ula C Ruddock
*Assistant Examiner* — Matthew Van Oudenaren
(74) *Attorney, Agent, or Firm* — Bruce Stone LLP; Joseph Bruce

(57) ABSTRACT

A connecting structure for exteriorly connecting a battery cell and a load circuit by using two graphite connecting graphite blocks, wherein the positive and negative electrode terminals of the battery cell are made of nickel, the battery cell is connected to the load circuit by the two connecting graphite blocks, respectively. The graphite is inexpensive and resistant to oxidation; whereas, the connecting graphite blocks and the nickel-plated metal made electrode terminals of the battery cell will dissolve in each other to form a carbon-nickel alloy after being brought into contact with one another, thus ensuring a smooth large-current discharge because of the reduction in resistance of external connection.

4 Claims, 4 Drawing Sheets

CONNECTING STRUCTURE FOR EXTERIORLY CONNECTING A BATTERY CELL AND A LOAD CIRCUIT BY USING TWO CONNECTING GRAPHITE BLOCKS

This application is a continuation in part of U.S. patent application Ser. No. 12/834,834, which claims the benefit of the earlier filing date of Jul. 12, 2010. Claims 1-4 of this application are revised from claims 1 and 4-6 of the U.S. patent application Ser. No. 12/834,834, respectively.

BACKGROUND OF THE INVENTION

Field of the Invention

The present invention relates to a non-welding and oxidation resistant connecting structure for exteriorly connecting a battery cell and a load circuit at a high conductivity.

Description of the Prior Art

Referring to FIG. 1 showing a conventional connecting structure for exteriorly connecting a single battery cell and a load circuit, wherein the single battery cell 10 and the load circuit 11 are connected in such a manner that a positive electrode terminal 12 and a negative electrode terminal 13 of the battery cell 10 each are brought into direct contact with a metal terminal 14 first, and then the metal terminals 14 will be connected to the load circuit 11. Due to direct contact between the electrode terminals and the metal terminals, a high contact resistance will be caused at the respective contact portions of the electrode terminals and the metal terminals, so that when the battery cell is switched on, the contact portion will heat up and consume power of the battery cell. To reduce the contact resistance, referring to FIG. 2, the battery cell 10 is connected to nickel sheets 15 by spot welding, and then the nickel sheets 15 are connected to the load circuit 11 to create the connection between the battery cell and the load circuit, greatly reducing the contact resistance while improving the non-oxidizability.

It is to be noted that, intense heat caused during the spot welding will be transmitted to the battery cell to cause damages to interior of the battery cell, such as: breakage of the seal gasket, and rupture of the isolating layers, and etc, thus leading to failure of the battery. In addition, the cost of the welding procedure is relatively high.

U.S. Pat. No. 4,382,116 discloses a conventional battery, wherein the electrodes of the battery are made of graphite and connected to the terminals by graphite current collectors, and the graphite current collectors are a necessary part of the battery and disposed inside the battery cell. U.S. Pat. No. 4,382,116 fails to disclose an external connecting structure for exteriorly connecting the battery to a load circuit by using two graphite blocks.

U.S. Pat. Pub. No. 2004/0265683 discloses a battery whose negative and positive terminals are made of nickel but without disclosing an external connecting structure for exteriorly connecting the battery to a load circuit by using two graphite blocks.

U.S. Pat. Pub. No. 2007/0092792 discloses a battery, wherein the negative and positive current collectors are a necessary part of the battery despite they are located outside the battery.

Hence, it can be found that the conventional connection between a battery cell and a load circuit cannot satisfy the basic requirements of the cost economics, high conductivity and high relativity. However, it will be a breakthrough to the existing battery-connection technique if the connection conductivity can be improved without the use of welding.

Hereafter, the present invention has arisen to mitigate and/or obviate the afore-described disadvantages.

SUMMARY OF THE INVENTION

The primary objective of the present invention is to provide a high conductivity connecting structure for exteriorly connecting a battery cell and a load circuit by using two connecting graphite blocks. In the present invention, the connecting graphite blocks are connected to the electrode terminals of the battery cell in a direct contact manner to realize a highly conductive connection without the use of the welding. Furthermore, the graphite is less-expensive compared to nickel so that the production cost can be greatly reduced.

The secondary objective of the present invention is to provide a connecting structure for exteriorly connecting a battery cell and a load circuit which mainly utilizes a first connecting graphite block and a second connecting graphite block that are respectively connected to a positive electrode terminal and a negative electrode terminal of a battery cell in a close contact manner to connect the battery cell and a load circuit. After being brought into contact with one another, the connecting graphite blocks and the positive, the negative electrode terminals of the battery cell will start a process of dissolving in each other, that is, carbon particles of the connecting graphite blocks will substitute for the foreign matters on the negative and the positive electrode terminals of the battery cell and fill the voids of the negative and the positive electrode terminals of the battery cell, forming a carbon-nickel alloy, thus ensuring a smooth large-current discharge due to reduction of the external connection resistance.

In order to achieve the above objectives, a connecting structure for exteriorly connecting a battery cell and a load circuit in accordance with the present invention comprises: a battery cell, a first connecting graphite block, and a second connecting graphite block.

The battery cell is exteriorly provided with a positive electrode terminal and a negative electrode terminal which are made of nickel-plated metal and served as power output terminals of the battery cell.

The first connecting graphite block is connected to the positive electrode terminal of the battery cell and a load circuit.

The second connecting graphite block is connected to the negative electrode terminal of the battery cell and the load circuit.

By such arrangements, the battery cell can be connected to the load circuit through the first and the second connecting graphite blocks.

DETAILED DESCRIPTION OF THE PREFERRED EMBODIMENTS

The present invention will be easily comprehended from the following description when viewed together with the accompanying drawings, which show, for purpose of illustrations only, the preferred embodiment in accordance with the present invention.

Figure 2:
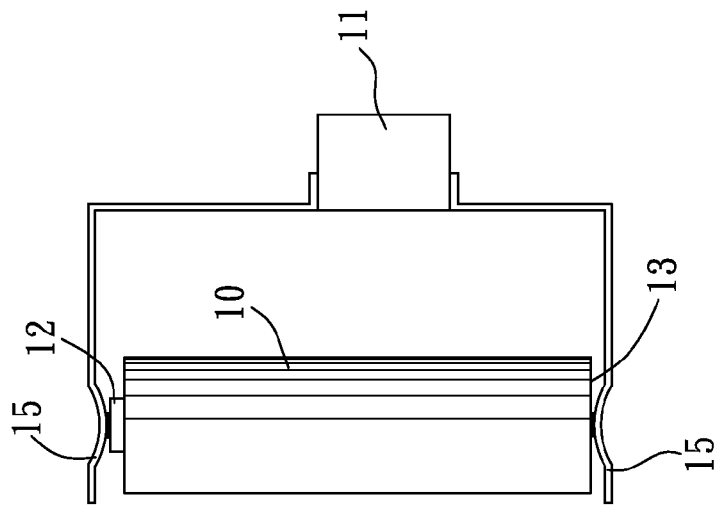
FIG. 2 is a schematic view of a conventional connecting structure for exteriorly connecting a battery cell and a load circuit which utilizes nickel sheets to connect the battery cell and the load circuit.
Figure 1:
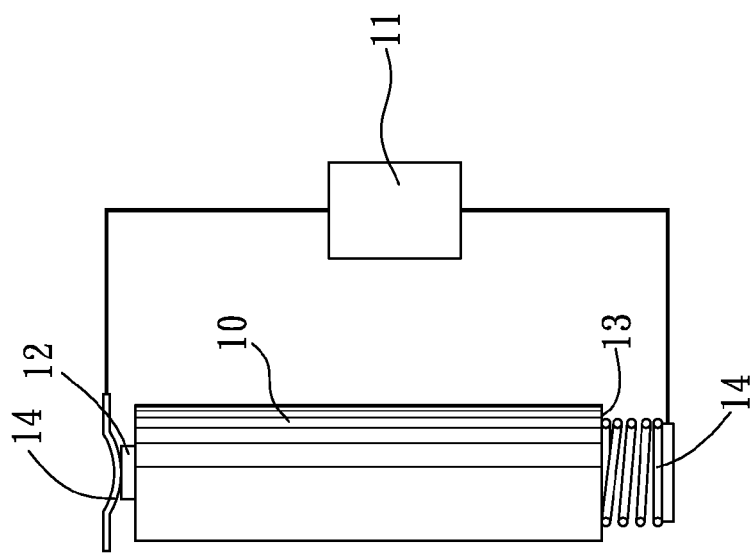
FIG. 1 is a schematic view of a conventional connecting structure for exteriorly connecting a battery cell and a load circuit which utilizes metal terminals to connect the battery cell and the load circuit.
Figure 3:
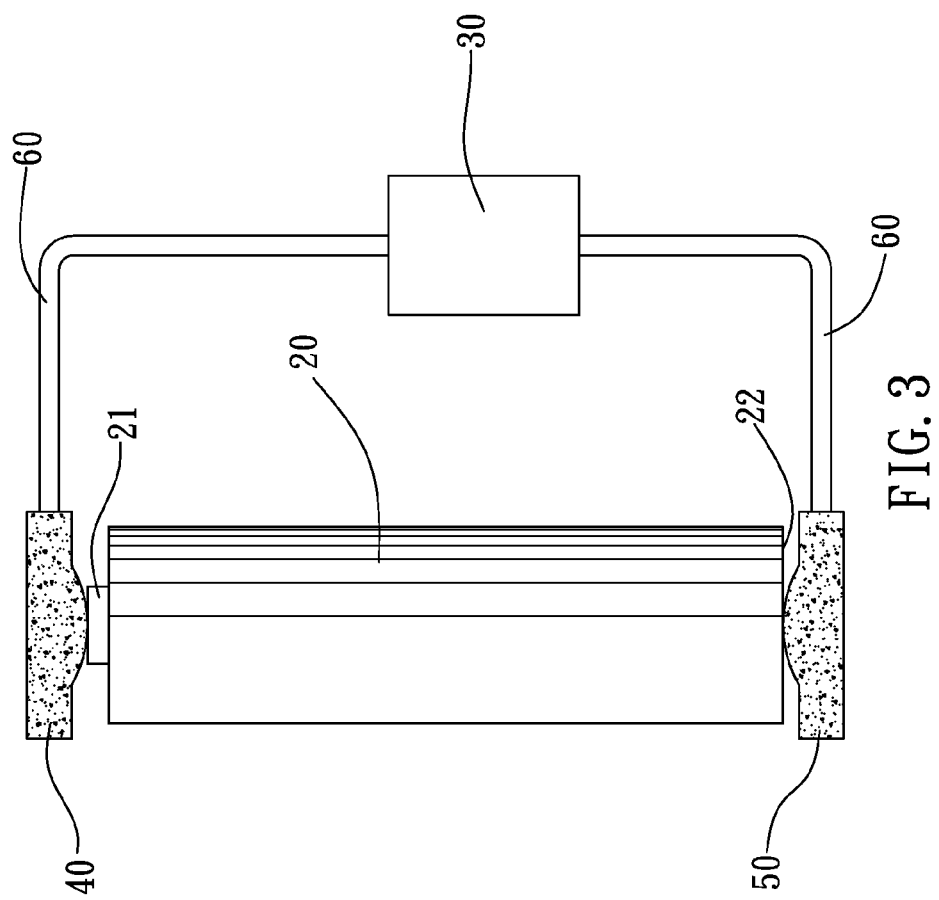
FIG. 3 is a schematic view of a connecting structure for exteriorly connecting a battery cell and a load circuit in accordance with the present invention utilizes two connecting graphite blocks to connect the battery cell and the load circuit.

Referring to FIG. 3, a connecting structure for exteriorly connecting a battery cell 20 and a load circuit 30 in accordance with the present invention comprises a first connecting graphite block 40 and a second connecting graphite block 50 which are electrically connected to a positive electrode terminal 21 and a negative electrode terminal 22 of the battery cell 20, and then connected to the load circuit 30. This connecting structure provides a relatively high electric conductivity between the battery cell 20 and the load circuit 30.

The battery cell 20 is a cylindrical battery cell and exteriorly provided on both ends thereof with the positive electrode terminal 21 and the negative electrode terminal 22 which are made of nickel-plated metal and served as power output terminals of the battery cell 20.

The first connecting graphite block 40 is made of a material selected from the group consisting of pure graphite, graphite alloy and conductive carbon. The graphite alloy can be a silver graphite (silver-carbon alloy), a copper graphite (copper-carbon alloy), and etc. The first connecting graphite block 40 is electrically connected to the positive electrode terminal 21 of the first battery cell 20 in a close contact manner.

The second connecting graphite block 50 is made of a material selected from the group consisting of pure graphite, graphite alloy and conductive carbon. The second connecting graphite block 50 is electrically connected to the positive electrode terminal 21 of the first battery cell 20 in a close contact manner. The battery cell 20 and the load circuit 30 are then electrically connected through the first and the second connecting graphite blocks 40, 50.

The first and the second connecting graphite blocks 40, 50 each are interiorly provided with a wire 60 serving as a power output wire of the battery cell 20, so that the first and the second connecting graphite blocks 40, 50 can be connected to the load circuit 30 through the wires 60.

The aforementioned is the summary of the positional and structural relationship of the respective components of the preferred embodiment in accordance with the present invention.

Figure 4:
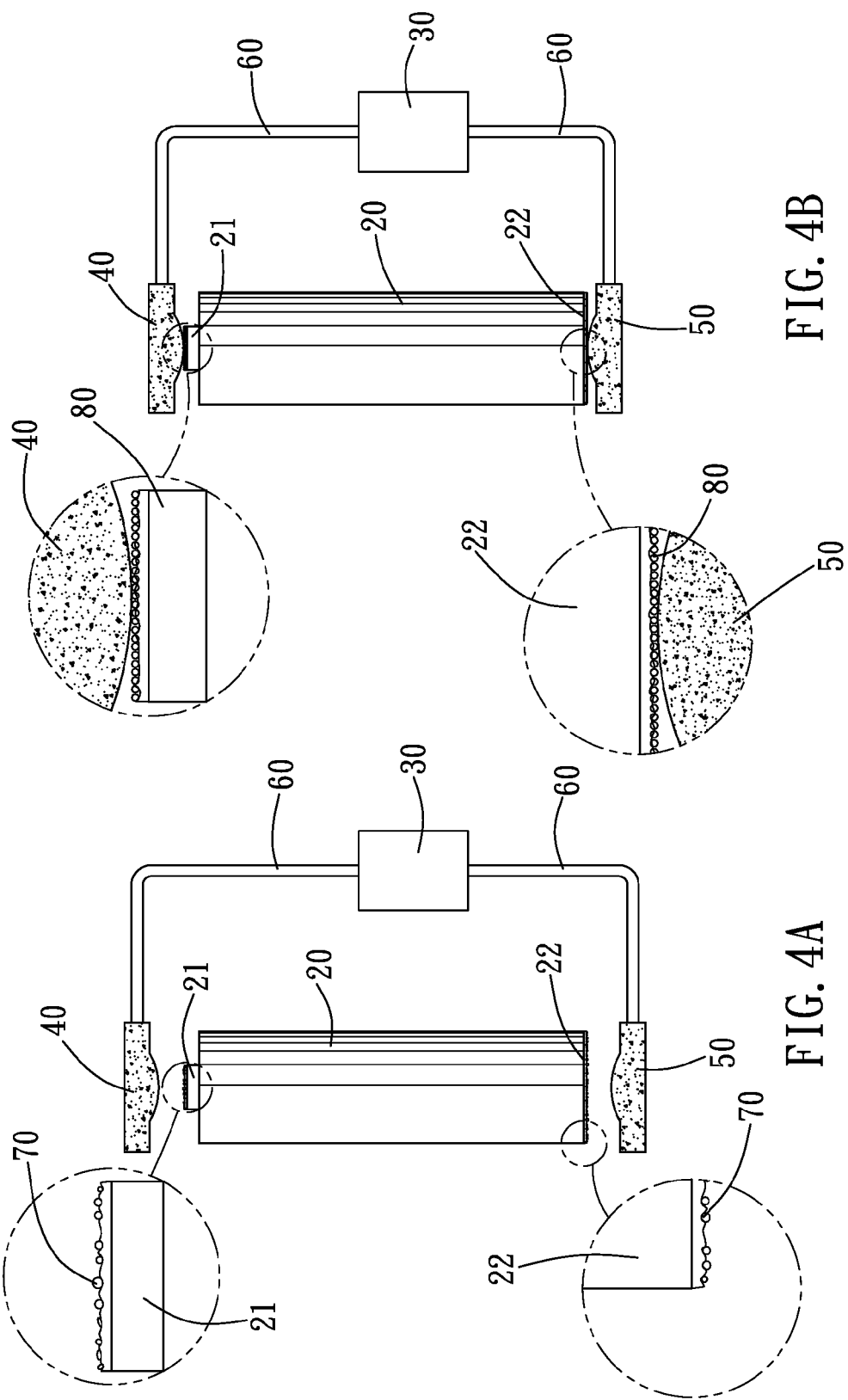
FIG. 4A shows the respective electrode terminals of the battery cell being covered with foreign matters in accordance with the present invention.
FIG. 4B shows carbon particles substituting for the foreign matters after the first and the second connecting graphite blocks are brought into contact with the electrode terminals in accordance with present invention.

For a better understanding of the present invention, its operation and function, reference should be made to the following description:

The positive and the negative electrode terminals 21, 22 of the battery cell 20 are both made of the nickel-plated metal, as shown in FIG. 4A, the positive and the negative electrode terminals 21, 22 each might be covered with foreign matters 70 or oxides, which will increase the connection resistance during the discharging process of the battery cell 20 while reducing the discharging power efficiency of the battery cell 20. Referring to FIG. 4B showing how to achieve high conductivity connection between the battery cell and the load circuit, the first and the second connecting graphite blocks 40, 50 are resistant to oxidation and electrically connected to the positive and the negative electrode terminals 21, 22 of the battery cell 20. The first and second connecting graphite blocks 40, 50 and the positive and negative electrode terminals 21, 22 of the battery cell 20 will dissolve in each other after being brought into contact with one another, that is, the carbon particles 80 of the first and the second connecting graphite blocks 40, 50 will substitute for the foreign matters 70 or oxides on the positive and negative electrode terminals 21, 22 made of nickel-plated metal so as to fill in the voids in the positive and the negative electrode terminals 21, 22 of the battery cell 20, forming a carbon-nickel alloy, which improves the connection conductivity between the first, the second connecting graphite blocks 40, 50 and the battery cell 20. In other words, after the battery cell 20 in accordance with the present invention is switched on, electric current will circulate through the battery cell 20, the first connecting graphite block 40 and the second connecting graphite block 50 smoothly without being affected by the inherent resistance caused by the oxides or the foreign matters 70, thus not only reducing the external connection resistance between the battery cell 20 and the load circuit 30, but facilitating discharge of the battery cell 20.

It is to be noted that the first and second connecting graphite blocks 40, 50 of the present invention are independent (separated) from and not necessary parts of the battery cell 20, the load circuit 30 is also independent from and not a necessary part of the battery cell 20, and the first and second connecting graphite blocks 40, 50 are located outside the battery cell 20 and used as an external connecting structure for connecting the battery cell 20 to the load circuit 30.

Furthermore, the "dissolving in each other" phenomenon will occur when and only when graphite material is brought into contact with nickel material. With that in mind, the author of the present invention came up with the idea of providing a high conductivity connecting structure which exteriorly connects a battery cell 20 with nickel terminals to a load circuit 30 by using two connecting graphite blocks 40, 50. When the connecting graphite alloy blocks 40, 50 are brought into contact with the nickel-made electrode terminals 21, 22 of the battery cell 20, it will start the process of "dissolving in each other". The process of "dissolving in each other" can remove oxidation or foreign matters from the electrode terminal 21, 22 of the battery cell 20 and will consequently improve the external contact conductivity of the battery cell 20. So far, no prior art was found teaching or suggesting the improvement of external contact conductivity of a battery cell 20 by bringing graphite alloy blocks 40, 50 (which are independent from and not necessary parts of the battery cell) into contact with nickel terminals 21, 22 of the single battery cell 20.

Figure 5:
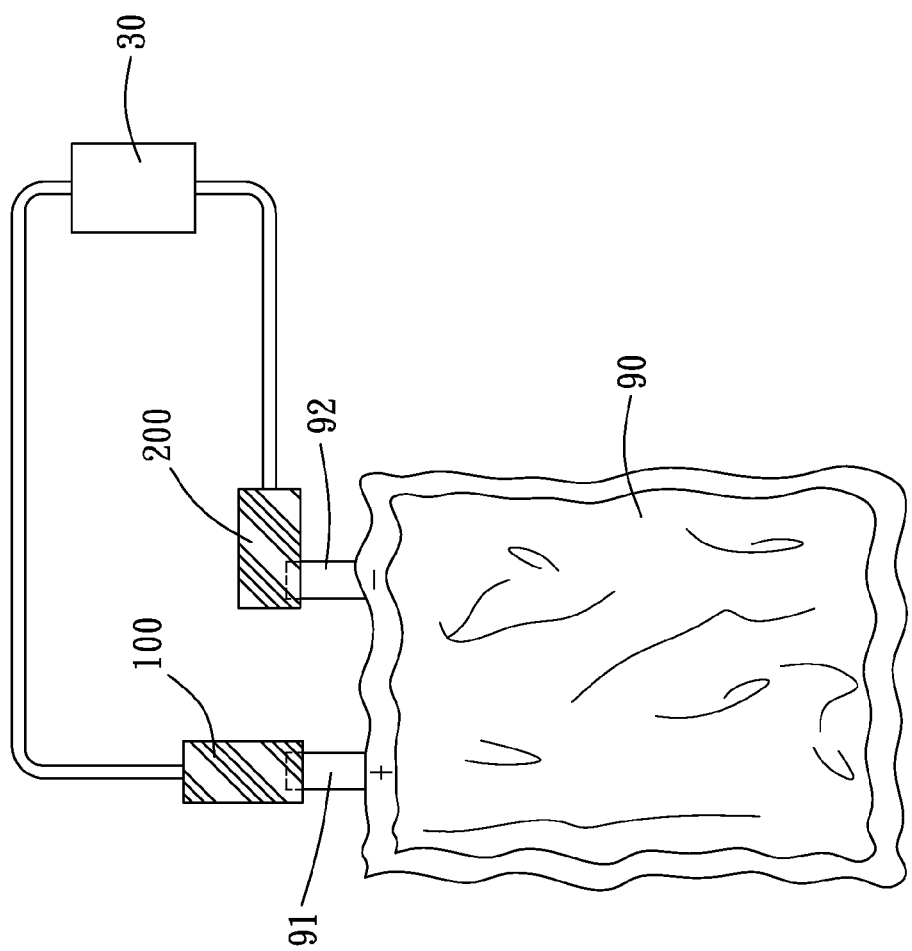
FIG. 5 is a schematic view showing that the connecting structure for exteriorly connecting a battery cell and a load circuit in accordance with the present invention utilizes two connecting graphite blocks to connect a coffee-bagged battery cell packaged in an aluminum bag to the load circuit.

In addition to the cylindrical battery cell with metal jacket, as shown in FIG. 5, the present invention is also applicable to a coffee-bagged battery cell 90 which is packaged in an aluminum bag. The positive and the negative electrodes of the coffee-bagged battery cell 90 are normally stamp-formed into a positive electrode tab 91 and a negative electrode tab 92 that are both made of nickel-plated metal.

When the coffee-bagged battery cell 90 is connected to the load circuit 30, a third connecting graphite block 100 and a fourth connecting graphite block 200 will be electrically connected to the positive and the negative electrode tabs 91, 92 of the coffee-bagged battery cell 90, respectively. It is to be noted that, the battery cell with metal jacket and the coffee-bagged battery cell, although having different shapes, are the same in terms of electrical connection effects. In other words, the technology of the present invention is independent to the internal configuration of the battery cell as long as the positive and the negative electrode terminals of the battery cell are made of the nickel-plated metal, hence, the battery cell and the load circuit can be connected through the connecting graphite blocks of the present invention to realize the high conductivity external connection therebetween.

While we have shown and described various embodiments in accordance with the present invention, it is comprehensive to those skilled in the art that further embodiments may be made without departing from the scope of the present invention.

What is claimed is:

1. A connecting structure for exteriorly connecting a battery cell and a load circuit by using two connecting graphite blocks comprising:
    a battery cell being exteriorly provided with a positive electrode terminal and a negative electrode terminal which are made of nickel-plated metal and served as power output terminals of the battery cell;
    the two connecting graphite blocks being a first connecting graphite block and a second connecting graphite block;
    the first connecting graphite block being separated from the battery cell and electrically connected to a load circuit; and
    the second connecting graphite block being located outside the battery cell and electrically connected to the load circuit;
    wherein the first and the second connecting graphite blocks are not a part of the battery cell and are made of graphite alloy;
    the first connecting graphite block is brought into contact with the positive electrode terminal of the battery cell, and the second connecting graphite block is brought into contact with the negative electrode terminal of the battery cell.

2. The connecting structure for exteriorly connecting a battery cell and a load circuit by using the two connecting graphite blocks as claimed in claim 1, wherein the graphite alloy is a silver-carbon alloy.

3. The connecting structure for exteriorly connecting a battery cell and a load circuit by using the two connecting graphite blocks as claimed in claim 1, wherein the graphite alloy is a copper-carbon alloy.

4. The connecting structure for exteriorly connecting a battery cell and a load circuit by using the two connecting graphite blocks as claimed in claim 1, wherein the first and the second connecting graphite blocks each are interiorly provided with a wire serving as a power output wire of the battery cell.

* * * * *